US008258919B2

(12) United States Patent
Corradino et al.

(10) Patent No.: US 8,258,919 B2
(45) Date of Patent: Sep. 4, 2012

(54) MOBILE DEVICE COMMUNICATIONS MANAGEMENT

(75) Inventors: Francois-Romain Corradino, La Pompignane (FR); John G. Musial, Somers, NY (US); Abhinay R. Nagpal, Pune (IN); Sandeep R. Patil, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/718,120

(22) Filed: Mar. 5, 2010

(65) Prior Publication Data
US 2011/0215900 A1 Sep. 8, 2011

(51) Int. Cl.
*G05B 19/00* (2006.01)
(52) U.S. Cl. ...... 340/5.52; 340/5.2; 340/5.53; 340/5.74; 340/5.4; 340/5.83; 340/5.84; 340/425.5; 340/466; 340/438; 340/463; 455/410; 455/411; 455/456.1; 455/456.4; 455/569.2
(58) Field of Classification Search .................. None
See application file for complete search history.

(56) References Cited

U.S. PATENT DOCUMENTS

| 7,567,861 | B2 | 7/2009 | Inagaki |
| 2007/0120948 | A1* | 5/2007 | Fujioka et al. ............. 348/14.01 |
| 2008/0009296 | A1 | 1/2008 | Han |
| 2008/0305735 | A1* | 12/2008 | Farnsworth et al. ............... 455/1 |
| 2009/0082951 | A1 | 3/2009 | Graessley |
| 2009/0085728 | A1 | 4/2009 | Catten et al. |
| 2010/0039224 | A1* | 2/2010 | Okude et al. ................. 340/5.83 |
| 2011/0009107 | A1* | 1/2011 | Guba et al. ..................... 455/418 |
| 2011/0275321 | A1* | 11/2011 | Zhou et al. .................... 455/41.2 |

OTHER PUBLICATIONS

Federal Motor Carrier Safety Administration, [online]; [retrieved on Feb. 25, 2010]; retrieved from the Internet http://www.fmcsa.dot.gov/facts-research/systems-technology/product-guides/vehicle-disabling.htm "Vehicle Disabling System", FMCSA.

* cited by examiner

*Primary Examiner* — Benjamin C Lee
*Assistant Examiner* — Curtis King
(74) *Attorney, Agent, or Firm* — Cantor Colburn LLP; Louis Percello

(57) ABSTRACT

Implementation of mobile device communications (MCD) management is provided. A method includes intercepting an input command received on an MCD, the command intercepted in response to detecting a presence of a fixed communications device (FCD), which is embedded in a vehicle within range of the MCD. The method also includes acquiring biometric data from a user of the MCD. The method includes determining an activity status of the vehicle. If the activity status reflects the vehicle is active, the method includes acquiring biometric data for an operator of the vehicle via a biometric scanner of the vehicle and comparing the biometric data from the vehicle with the biometric data for the user of the MCD. If the biometric data from the vehicle matches the biometric data from the MCD, the method includes retrieving an account record for the user and implementing an action specified in the account record. If the activity status reflects the vehicle is inactive, the method includes executing the command.

24 Claims, 3 Drawing Sheets

MOBILE DEVICE COMMUNICATIONS MANAGEMENT

BACKGROUND

The present invention relates to data processing, and more specifically, to managing mobile device communications.

With recent advancements in technology, mobile devices have become increasingly more affordable to the consuming public. The portability, convenience, and resulting popularity of these devices have inspired the development and deployment of an abundance of various mobile applications for use with these devices, each designed to appeal to the differing needs and interests of these consumers.

Currently, most mobile devices on the market offer text messaging for enabling communications in the form of text, as opposed to voice communications. Text messaging (also known as "texting") enables the user of the mobile device to compose a message in text format via buttons on a keypad of the device that correspond to alphanumeric characters. Depending upon the length of the message, composing a text-based communication requires near-constant visualization of the keypad by the user for a period of time sufficient to allow access of the text messaging application on the device, identification (or entry) of an address to which the message will be sent, composition of the communication content, and selection of an option that directs the mobile device to transmit the message.

Due to the nature of text messaging, i.e., it's requirement that the user visually focus on the device for a period of time, its use is not conducive in certain situations that require extended visual and/or mental focus, such as operating a vehicle. Texting while driving has become an increasing concern, particularly its use among young adults who are most inclined to engage in this activity. Due to its inherent nature, texting while driving can dramatically increase the likelihood of the driver being involved in an accident.

Several approaches have been taken to alleviate the concerns associated with texting while driving. These approaches include posting signs to remind drivers of the dangers of texting while driving and issuing public service announcements. Providing this valuable information/reminders may resonate with some drivers, but is largely ignored by many others, in part, because the rewards of texting typically outweigh the perceived risks (e.g., many drivers do not appreciate the potential risks involved with this activity). Various hands-free methods of mobile device operation have been devised, however, these methods are only useful if willingly implemented by the user. Unfortunately, there is no way to ensure such hand-free methods will be employed.

Many communities have enacted legislation that criminalizes the practice of texting while driving. Unfortunately, however, enforcement of such legislation is generally ineffective as texting can be performed in the vehicle with the device out of clear view of law enforcement officials (e.g., below the wheel). Additionally, many law enforcement agencies are inundated with other traffic management matters (e.g., speed enforcement, expired vehicle registrations/inspection stickers, accidents, and road repair management, etc.) and, as a result, lack the necessary resources to monitor this activity.

The consequences of texting while driving can be extensive. For example, parents of children who are inexperienced drivers may be concerned that the lack of driving experience, coupled with the visual and mental distraction attributed to texting behind the wheel, places these children at great risk of harm or loss of life. Likewise, various businesses may also be affected by this activity. For example, a business that employs individuals to operate vehicles (e.g., trucking companies, limousine services, etc.) during the course of employment may be concerned about insurance costs and resulting financial liability for those employees who may become involved in an accident as a result of texting while driving. Additionally, mass transportation companies (e.g., bus, train, subway, etc.), whose operators were found to be texting while driving at the time of an accident, have not only experienced millions of dollars in damage to property/cargo, but have also faced related medical and/or legal liabilities.

What is needed, therefore, is a way to deter operators of vehicles from utilizing components of a communications device that are determined to be visually distracting or require a level of visual and/or mental focus.

SUMMARY

According to one embodiment of the present invention, a method for mobile device communications management is provided. A method includes Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide for management of mobile device communications. Mobile device communications management provides a means by which operators of vehicles are prevented or otherwise deterred from utilizing components of a communications device that are determined to be visually distracting or require a level of visual and/or mental focus. In an exemplary embodiment, the mobile device communications management involves the integration of a biometric enabled vehicle and mobile communications devices to dynamically identify an operator of the vehicle and disable or deter access of various components of the mobile communications device at the time the particular user is trying to use the mobile communications device and/or in the future. The mobile device communications management enables a user having maximum permissions (referred to herein as "superuser") of an account (e.g., owner of a vehicle, parent of a household, employer/owner of a business) to configure components of the exemplary system and services, as described further herein.

Figure 1:
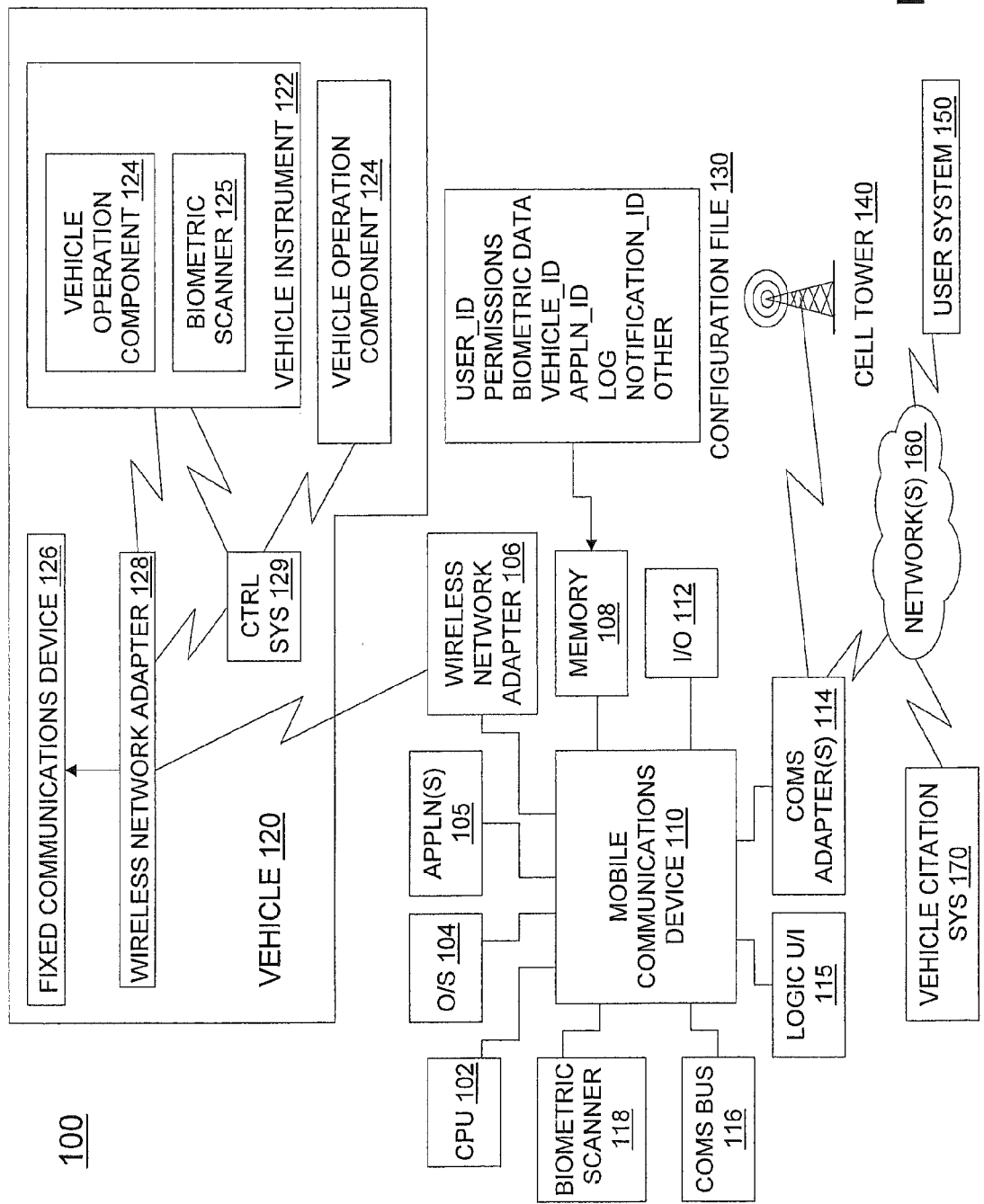
FIG. 1 depicts a block diagram of a system upon which mobile device communications management may be implemented in an exemplary embodiment.

With reference now to FIG. 1, an exemplary system 100 upon which the mobile device communications management may be implemented will now be described.

In one exemplary embodiment, the system 100 of FIG. 1 includes a mobile communications device 110 in communication with a vehicle 120, a cell tower 140, a user system 150, one or more networks 160, and a vehicle citation system 170. The mobile communications device 110 may be implemented, e.g., as a cellular telephone, personal digital assistant, or other similar device that is capable of communicating with other devices over a wireless network. In one exemplary embodiment, and as shown in FIG. 1, the mobile communications device 110 is a cellular telephone. The exemplary mobile communications device 110 of FIG. 1 includes one or more computer processing units (CPUs) 102, an operating system (O/S) 104, one or more mobile applications 105, and a wireless network adapter 106. The mobile communications device 110 also includes internal memory 108, input/output (I/O) components 112, and one or more communications adapters 114. In addition, the mobile communications device 110 includes logic 115, a communications bus 116, and biometric scanner 118. The CPUs 102 execute instructions received from the operating system 104, the mobile applications 105, and the logic 115 via the communications bus 116, as well as from external entities, e.g., the user system 150 and vehicle citation system 170 via networks(s) 160, or other mobile communications devices (not shown) via the wireless network adapter 106, networks 160, and/or the communications adapter 114.

The mobile applications 105 may include web-based applications (e.g., browser software), communications applications (e.g., texting software, email, instant messaging, etc.), games, and other types of applications typically associated with mobile communications devices. Some of these applications 105 may be implemented over a communications network (e.g., a cellular telephone network) via the communications adapter 114, cell tower 140, and related systems. Additionally, some of the applications 105 may be implemented, e.g., via one or more communications adapters 114 over a data network, such as network 160, which may be the Internet.

The wireless network adapter 106 enables the mobile communications device 110 to communicate over short distances using, e.g., radio wave technology and wireless protocols. In an exemplary embodiment, the wireless network adapter 106 implements Bluetooth™ technology, which is a radio frequency standard used for short-range wireless networks (e.g., a personal area network, or piconet). In an exemplary embodiment, the mobile communications device 110 communicates with a fixed communications device 126 over a personal area network (not shown) via a wireless network adapter 128 coupled to the fixed communications device 126, as will be described further herein.

The input/output components 112 of the mobile communications device 110 provide an interface between the user of the mobile communications device 110 and its internal components via, e.g., the communications bus 116. Input components 112, e.g., may include a touch screen, keypad, audio receiver/recorder, or other similar input means. The output components 112 may include a display screen, audio transmitter, or other similar output means.

In an exemplary embodiment, the mobile communications device 110 is configured to implement the biometric scanner 118, which acquires biometric data from a user of the mobile communications device 110. The biometric scanner 118 may be any type of scanner device that is capable of uniquely identifying a user of the mobile communications device 110 through the collection of biometric data. For example, the biometric scanner 118 may be a fingerprint scanner that is embedded within a keypad of the mobile communications device 110, and which upon scanning fingerprint data from a user via the keypad, stores the data in the memory 108 (e.g., a configuration file 130). In alternative embodiments, the biometric scanner 118 may use facial recognition technology or similar means to uniquely identify the individual. For purposes of illustration, the biometric scanner 118 described herein is a fingerprint scanner and the biometric data acquired from the scanner 118 is directed to fingerprint data.

The logic 115 includes instructions for implementing the exemplary mobile device communications management services described herein. As shown in FIG. 1, the logic 115 is implemented via the mobile communications device 110; however, it will be understood that the logic 115 may be shared among devices in the system 100 of FIG. 1. For example, at least a portion of the logic 115 may be implemented by the fixed communications device 126, the vehicle citation system 170, the user system 150, and/or components within the vehicle 120 in order to realize the advantages of the exemplary embodiments.

In an exemplary embodiment, the memory 108 of the mobile communications device 110 stores various data, files, and applications (e.g., applications 105 and logic 115). In addition, the memory 108 may store one or more configuration files 130 for use in implementing the mobile device communications management services described herein.

In an exemplary embodiment, vehicle 120 is a motorized vehicle for transporting individuals and/or goods, e.g., a car, truck, motorcycle, etc. The vehicle 120 may be privately owned and operated or may be operated as a public transportation service. For example, the vehicle 120 may be a family-owned and operated car or a vehicle provided by a rental company. The vehicle 120 may alternatively be a bus, taxi, chauffeured limousine, train, subway, or similar vehicle operated as a transportation service.

The vehicle 120 includes the fixed communications device 126, which in turn includes the wireless network adapter 128. As used herein, the term "fixed" refers to a physical or logical association between the fixed communications device 126 and a particular vehicle, such as vehicle 120. Moreover, the fixed communications device 126 may be physically installed or embedded in the vehicle 120, or may be removably attached to the vehicle 120. A physical association between the fixed communications device 126 and one or more components of the vehicle 120 (e.g., vehicle instrument 122) may be implemented via electrical cabling or similar wireline means. A logical association between the fixed communications device 126 and the vehicle 120 (e.g., vehicle instrument 122) may be implemented, e.g., via the wireless network adapter 128. In an exemplary embodiment, the fixed communications device 126 is 'fixed' in the sense that it is configured to operate with the vehicle in which it is placed or installed.

In one exemplary embodiment, the fixed communications device 126 includes a portion of the components described above with respect to the mobile communications device 110 (e.g., a computer processor, logic, memory (not shown)) for enabling communication between the vehicle 120 and the mobile communications device 110 as will be described further herein. The wireless network adapter 128 enables the vehicle instrument 122 to communicate over short distances using, e.g., radio wave technology and wireless protocols (e.g., Bluetooth™). In an exemplary embodiment, data is received by the wireless network adapter 128 from the vehicle instrument 122 over a personal area network (not shown).

Likewise, the wireless network adapter 128 distributes data to and from the wireless network adapter 106 of the mobile communications device 110.

The vehicle instrument 122, as used herein, refers to a combination of a vehicle operation component 124 and a biometric scanner 125. In one exemplary embodiment, the biometric scanner 125 is embedded in the vehicle operation component 124. The vehicle operation component 124 may be any element of the vehicle 120, which comes into physical contact with, or is otherwise under the control of, an operator of the vehicle 120, the use of which component 124 aids in the physical operation and sustained mobility of the vehicle 120. For example, the vehicle operation component 124 may be a steering wheel or a stick shift on a standard vehicle. For purposes of illustration, the vehicle operation component 124 is described herein as a steering wheel. The vehicle operation component 124 is configured to implement the biometric scanner 125, which acquires biometric data from an operator of the vehicle 120. The biometric scanner 125 may be any type of scanner device that is capable of uniquely identifying an operator of the vehicle 120 through the collection of biometric data. For example, the biometric scanner 125 may be a fingerprint scanner that is embedded within a steering wheel (vehicle operation component 124), and which upon scanning fingerprint data from the operator via the steering wheel, stores the data (e.g., in a memory location of fixed communications device 126). In alternative embodiments, the biometric scanner 125 may use facial recognition technology or similar means to uniquely identify the individual. For purposes of illustration, the biometric scanner 125 described herein is a fingerprint scanner and the biometric data acquired by the scanner is fingerprint data.

In one exemplary embodiment, the vehicle 120 includes additional vehicle operation components that may be external to the vehicle instrument 122, an example of which is shown in FIG. 1. The vehicle operation component 124 that is external to the vehicle instrument 122 is communicatively coupled to a control system 129 and may include, e.g., a transmission system, headlights, gas/brake pedals, and/or horn of the vehicle 120. The control system 129 is communicatively coupled to the fixed communications device 126 via the wireless network adapter 128, such that upon receiving instructions from the logic 115 via the fixed communications device 126, the control system 129 directs an associated vehicle operation component (e.g., one or more of vehicle operation components 124) to implement an action or alter its current activity. The logic 115 may be configured to enable a user to determine which actions should be implemented in response to identifying an attempt by an operator of the vehicle to initiate activities with respect to the mobile communications device 110 while the vehicle 120 is determined to be actively engaged. For example, the control system 129 may receive an instruction from the logic 115 via the fixed communications device 126 and wireless network adapter 128 to modify the operation of a particular vehicle operation component. Using an accelerator (gas pedal) as an example of a vehicle operation component 124, the control system 129 may adjust the accelerator to reduce the speed of the vehicle 120. In another example, the headlights or horn may be activated in response to determining to an attempt by an operator of the vehicle 120 to initiate activities with respect to the mobile communications device 110 while the vehicle 120 is determined to be actively engaged.

As indicated above, a vehicle citation system 170 and user system 150 are in communication with the mobile communications device 110 via one or more networks, such as networks 160. In an exemplary embodiment, the vehicle citation system 170 represents an entity that governs vehicle operators and related operations. For example, the vehicle citation system 170 may be part of a law enforcement agency (e.g., traffic enforcement, registry of motor vehicles, etc.), vehicle insurance agency, or similar enterprise. The user system 150 may represent an end user of the mobile device communications services, such as a master account holder associated with the mobile communications device 110 and vehicle 120. The vehicle citation system 170 and the user system 150 may each be implemented, e.g., by one or more computer processing devices that execute one or more applications in support of the mobile device communications services. For example, the vehicle citation system 170 may implement software for tracking vehicle registrations, citations, or other information relevant to its business. The vehicle citation system 170 may employ the mobile device communications services (e.g., via a portion of the logic 115), in combination with its own tools, monitor data provided by the vehicle 120 and mobile communications device 110 (e.g., via the communications adapter 114 and networks 160) for identifying vehicle operators who are not in compliance with regulations concerning the usage of mobile communications devices while operating a vehicle. For example, an operator of vehicle 120 who is determined to be non-compliant with such regulations may be tagged by the vehicle citation system 170, which in turn generates and sends a citation notice, warning, or similar notice to the operator (e.g., via the postal mail) or electronically to the account holder via the user system 150.

The user system 150 may include a portion of the logic 115 for managing the services of the mobile device communications system. Some of the functionality available to the user system 150 (and, optionally, via the mobile communications device 110) is shown and described in FIG. 3, as well as via the configuration file 130 of FIG. 1.

In an exemplary embodiment, the configuration file 130 (also referred to herein as "account record") stores information for an account that is serviced by the mobile device communications management system. The information may include, e.g., user identifications (USER_ID field), authorization values (PERMISSIONS field), biometric information (BIOMETRIC DATA field), one or more vehicle identifiers (VEHICLE_ID field), application (identifiers) associated with one or more mobile communication devices (APPLN_ID field), log files (LOG field), notification selections (NOTIFICATION_ID field), and other options (OTHER field).

A user identification may include a telephone number of the mobile communications device 110. Alternatively, the user identification may include a unique character or alphanumeric string that identifies the mobile communications device 110 and which is used in combination with biometric data to uniquely identify the user of the device 110. The logic 115 may be configured such that an administrator (e.g., a parent, security officer, IT administrator, business owner, etc.) may be provided with maximum permissions to set up, modify, or cancel any settings with respect to implementation of the mobile device communications management services. As indicated above, the biometric data may include one or more fingerprints associated with users of the mobile communications device 110. A fingerprint scan for each of the users in the account may be completed and the scan data stored in the configuration file 130 (via the BIOMETRIC DATA field) for use in identifying a current or future user of the mobile communications device 110. In addition, the vehicle identifier may be a string of characters that uniquely identifies one or more vehicles (e.g., vehicle 120) for which the mobile device communications management services may be implemented with respect to one or more mobile communications devices (e.g., the mobile communications device 110). The application identifier field may be used to enable a user of the account with maximum access permissions to identify and select which applications (e.g., one or more of applications 105) that are to be restricted for access based upon a vehicle activity status. A permissions value indicating the level of permissions granted to a user may be stored in the configuration file 130 via the PERMISSIONS field. Log files may be generated in which activities conducted by a user of the account are recorded with respect to the mobile communications device 110 and one or more vehicles of the account. In addition, a user with maximum permissions for the account may configure the services to generate and send notifications based upon one or more activities conducted by a user in the account. Other settings (e.g., OTHER field) may be configured to enable a user with maximum permissions to select and implement customized or unique features of the mobile device communications management services. These data fields shown in the configuration file 130 are described further herein.

In one exemplary embodiment, the data provided in the configuration file 130 may be derived from input received from an administrator of an account who has full access privileges with respect to the mobile device communications management services. The input may be provided via, e.g., a user interface component of the logic 115 (e.g., a web-based interface) or other suitable means. The user interface component of the logic 115 may be provided to a user via the mobile communications device 110, the user system 150, the vehicle citation system 170, the fixed communications device 126, or other means. A sample user interface screen 300 for implementing these settings is shown and described in FIG. 3.

As indicated above, the mobile device communications management services provide a means by which various components of a mobile communications device (e.g., mobile communications device 110) are controlled based upon user-defined settings. In one exemplary embodiment, the user-defined settings may be implemented, e.g., via the mobile communications device 110 using an interface component of the logic 115. A sample user interface screen in which the user-defined settings may be implemented is shown and described in FIG. 3. In an alternative exemplary embodiment, the user-defined settings may be implemented via a computer processing device (e.g., the user system 150 of FIG. 1) through a web browser application that, in turn, accesses a web site of an enterprise hosting the mobile device communications management services. Once these settings are effectuated, the mobile device communications management services may be implemented as will be described herein.

Figure 2:
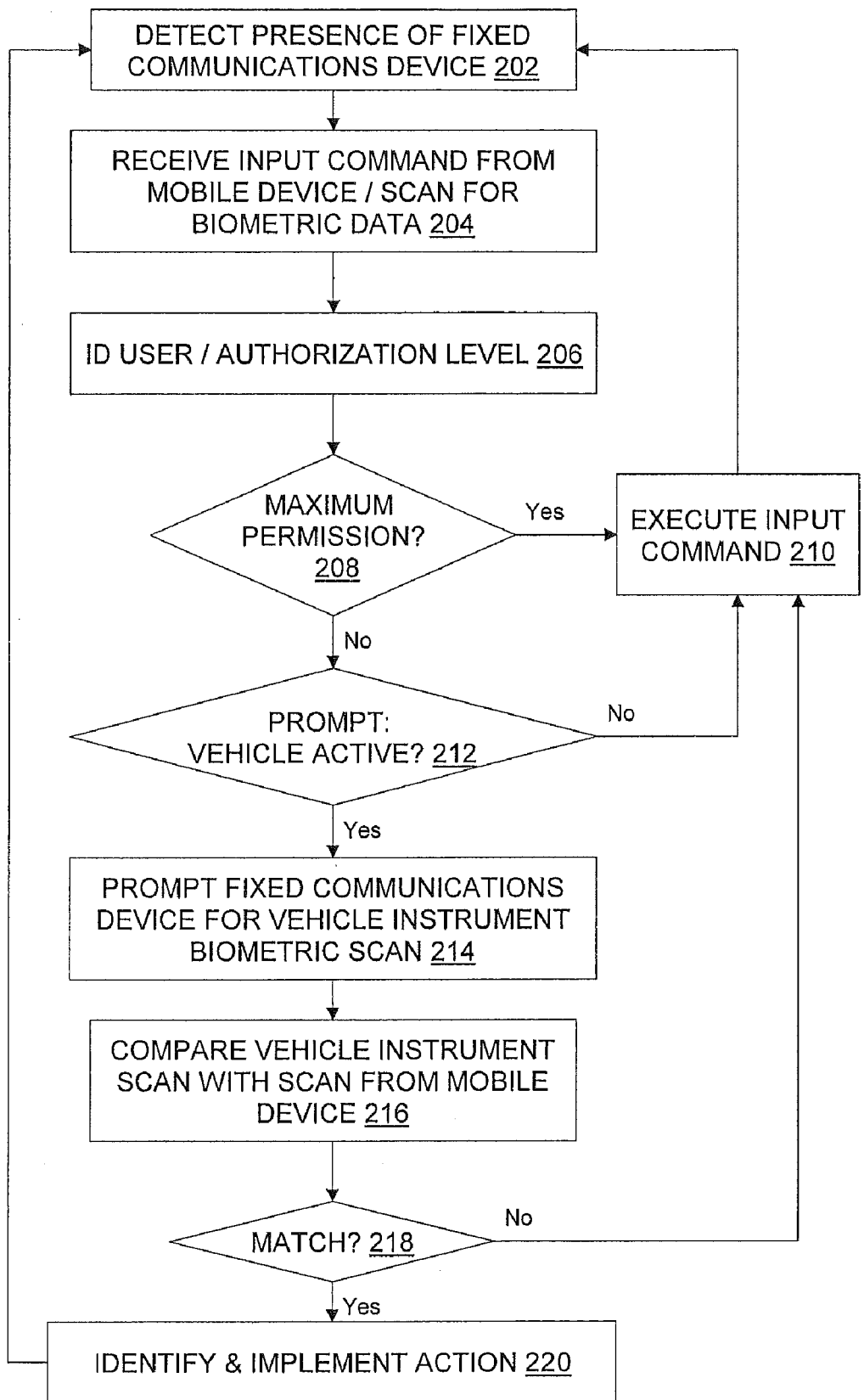
FIG. 2 illustrates a flow diagram describing a process for implementing the mobile device communications management in an exemplary embodiment.

Turning now to FIG. 2, an exemplary process for implementing the mobile device communications management services will now be described. For purposes of illustration, and by way of non-limiting example, the biometric data scanned and processed in FIG. 2 is fingerprint data. It is also assumed for purposes of FIG. 2, a user of a mobile communications device is within, or approaching, a vehicle for which the mobile device communications management services are configured. Additionally, it is also assumed for purposes of FIG. 2, an account holder associated with the mobile communications device 110 has maximum permissions assigned to his/her user identifier in the configuration file 130, and all other users identified for the account have restricted permissions based upon settings adopted by the account holder.

At step 202, the mobile communications device 110 detects the presence of the fixed communications device 126 (e.g., a user of the mobile communications device 110 enters the vehicle 120). In an exemplary embodiment, the presence of the fixed communications device 126 is detected by the mobile communications device 110 via respective wireless network adapters 106/128.

At step 204, an input command is received at the mobile communications device 110 via the I/O 112 in response to the user's input selections (e.g., the user may attempt to peruse a contact list, check incoming messages, browse the web, etc.). The logic 115 intercepts this command before its execution and receives biometric data (fingerprint scan) from the biometric scanner 116.

At step 206, the logic 115 identifies the user of the mobile communications device 110, as well as the user's authorization (permissions) level. The identification of the user may be implemented by comparing the biometric data scanned and received in step 204 with biometric data stored in memory 108 (e.g., configuration file 130) and checking for a match. The authorization level may be determined, e.g., via the phone number of the mobile communications device 110 that is associated with the user (e.g., if the mobile communications device 110 is a mobile device operated solely by the user), whereby a pre-defined authorization value is configured for the user and retrieved from the memory 108 based upon the identification of the user. For example, the configuration file 130 may link attributes to one another, such as user name or ID, mobile device number, permissions level, fingerprint scan of the user, vehicle ID, etc. Thus, e.g., if a fingerprint scan received via the biometric scanner 118 matches a fingerprint scan in memory 108 (e.g., via the BIOMETRIC DATA field in configuration file 130), the fingerprint scan in memory may be used as a key to point to corresponding attributes that identify the user, as well as various settings adopted by the account holder. The permissions value identifies whether the user has maximum authorization or a subset of permissions configured for the services. For example, a user with maximum permissions (i.e., superuser) is provided with the capabilities for establishing an account, adding or deleting account users, as well as modifying account settings.

At step 208, it is determined whether the user holds a maximum permission value. In an exemplary embodiment, a user who holds the maximum permission value (e.g., a parent, an owner/employer of a business, an administrator) may be allowed to perform all functionality with respect to the mobile communications device 110 regardless of whether the vehicle 120 is actively engaged or not. In other words, the logic 115 may be configured to enable the user with maximum permissions to implement any feature of the mobile communications device 110 even while operating the vehicle 120.

If the user holds a maximum permission value, the logic 115 relays the input command to the appropriate application (e.g., applications 105), which then executes the input command at step 210. In this embodiment, since the user is identified as having maximum permissions, there is no need to perform the remaining steps of FIG. 2, so the process returns to step 202.

Otherwise, if the user does not have maximum permission, the mobile communications device 110, via the logic 115 and the wireless adapters 106/128, prompts the fixed communications device 126 for an activity status of the vehicle 120 at step 212. In one exemplary embodiment, the activity status is determined by the presence of biometric data captured from biometric scanner 125 for vehicle instrument 122 over a pre-defined sustained time period. This sustained capture of biometric data on the instrument 122 strongly suggests that the user of the mobile communications device 110 is currently engaged in operation of the vehicle 120 (i.e., driving the vehicle). The pre-defined sustained time period may be configured to allow for instances in which the user has already been determined to be the driver of the vehicle 120, and while the user may come into contact with the instrument 122, the lack of sustained biometric data capture suggests that the user is not actively engaged in operating the vehicle (e.g., vehicle's transmission is in "park" or "neutral" while the user is parked at a rest stop or idle in a parking lot, as may be determined by data derived from the transmission as a vehicle operation component 124 via the control system 129).

If the activity status of the vehicle 120 indicates that the vehicle 120 is inactive, this suggests that the user of the mobile communications device 110 is not operating the vehicle 120. In this instance, the logic 115 relays the input command to the corresponding application 105 and the mobile communications device 110 executes the input command at step 210. The process returns to step 202.

Otherwise, if the activity status of the vehicle 120 reflects that the vehicle 120 is active at step 212, the mobile device communications management services checks to see if the user of the mobile communications device 110 is also the operator of the vehicle 120. The logic 115 prompts the fixed communications device 126 for biometric scan data at step 214. The biometric data captured by the scanner 125 is transmitted by the vehicle instrument 122 to the fixed communications device 126, which in turn sends the biometric data via its wireless network adapter 128 to the mobile communications device 110. Alternatively, the biometric data may be continuously captured via the vehicle instrument 122 and automatically stored in a memory location at the fixed communications device 126 for access by the mobile communications device 110.

Upon receiving the biometric scan data from fixed communications device 126, the logic 115 compares the biometric data from the vehicle instrument 122 scan with the biometric data from the mobile device 110 scan at step 216.

At step 218, it is determined whether a match exists between the two scans. If not, this means the user of the mobile communications device 110 is not the same as the operator of the vehicle 120 (e.g., may be a passenger in the vehicle 120). The logic 115 relays the input command to the corresponding application 105 of the mobile communications device 110, which then executes the input command at step 210 and the process returns to step 202.

Otherwise, if the two scans match at step 218, this means the user of the mobile communications device 110 is the same as the operator of the vehicle 120. In this instance, the logic 115 retrieves the corresponding configuration file 130 to determine one or more actions that will be taken. For example, the account holder may select settings for each of the users in the account, such as disabling one or more components of the mobile communications device 110. The logic 115 may be configured via the settings to disable the I/O functionality of the mobile communications device 110 (e.g., the keypad or touch screen), such that no activity can be performed on the mobile communications device 110. Alternatively, the logic 115 may be configured via the settings to control access to one or more applications 105 on the mobile communications device 110, such as a text messaging application, a web browsing application, or other applications determined (e.g., by the user having maximum permissions) to be visually distracting or which require visual and mental focus that is believed to impact the user's ability to safely operate the vehicle 120. This assessment of which components/applications have a tendency to be visually distracting may be a subjective one based upon the nature or frequency of use of the mobile communications device 110 and its applications. For example, a 17-year old new driver who is known to frequently use text messaging as a form of communication may be a prime candidate for disabling access to a text messaging component of the driver's mobile communications device 110. Another individual, who consumes an inordinate amount of time using several applications 105, may be subject to complete disablement of the mobile communications device 110 while operating a vehicle 120. Thus, the action taken may be customized for each user in the account.

In further exemplary embodiments, the logic 115 may be configured such that control over the use of a mobile communications device may be tied to a particular vehicle. For example, if an account holder with maximum permissions owns two vehicles and has a child who operates only one of these vehicles, the logic 115 may be configured on the mobile communications device 110 to control access to the mobile communications device 110 only for the vehicle operated by the child. This setting may be implemented by the account holder, e.g., via the VEHICLE_ID field in the configuration file 130 of FIG. 1. Thus, the action taken may be customized for each vehicle in the account.

The logic 115 may be configured for initiating any number of additional actions. For example, actions taken may include generating a notification that indicates the date, time, and nature of an event that triggered the notification (an operator of the vehicle 120 is determined to have accessed a text messaging application 105 on the mobile communications device 110. The notification may include the date, time and description of the application accessed). An account holder (e.g., via the user system 150) and/or the vehicle citation entity (e.g., via the vehicle citation system 170) may configure the logic 115 to generate a notification in response to any access to the mobile communications device 110 while the user is operating a vehicle, or may configure the logic 115 to generate a notification in response to a specific application accessed by the user while operating the vehicle. Additionally, or alternatively, the account holder may configure the logic 115 to generate a warning that is issued to the user of the mobile communications device while operating the vehicle. In a further embodiment, the account holder may configure the logic 115 to implement multiple actions in any desired combination (e.g., first offense: issue a warning to the user; second offense (or continuance of the first offense): issue warning to user and notification to account holder; third offense: disable application or entire mobile communications device 110, generate a citation of offense, and/or adjust accelerator to reduce speed). Warnings generated by the logic 115 may be transmitted directly to the mobile communications device 110. Notifications may be transmitted to the account holder via, e.g., the user system 150 or to another mobile communications device that is associated with the account.

Figure 3:
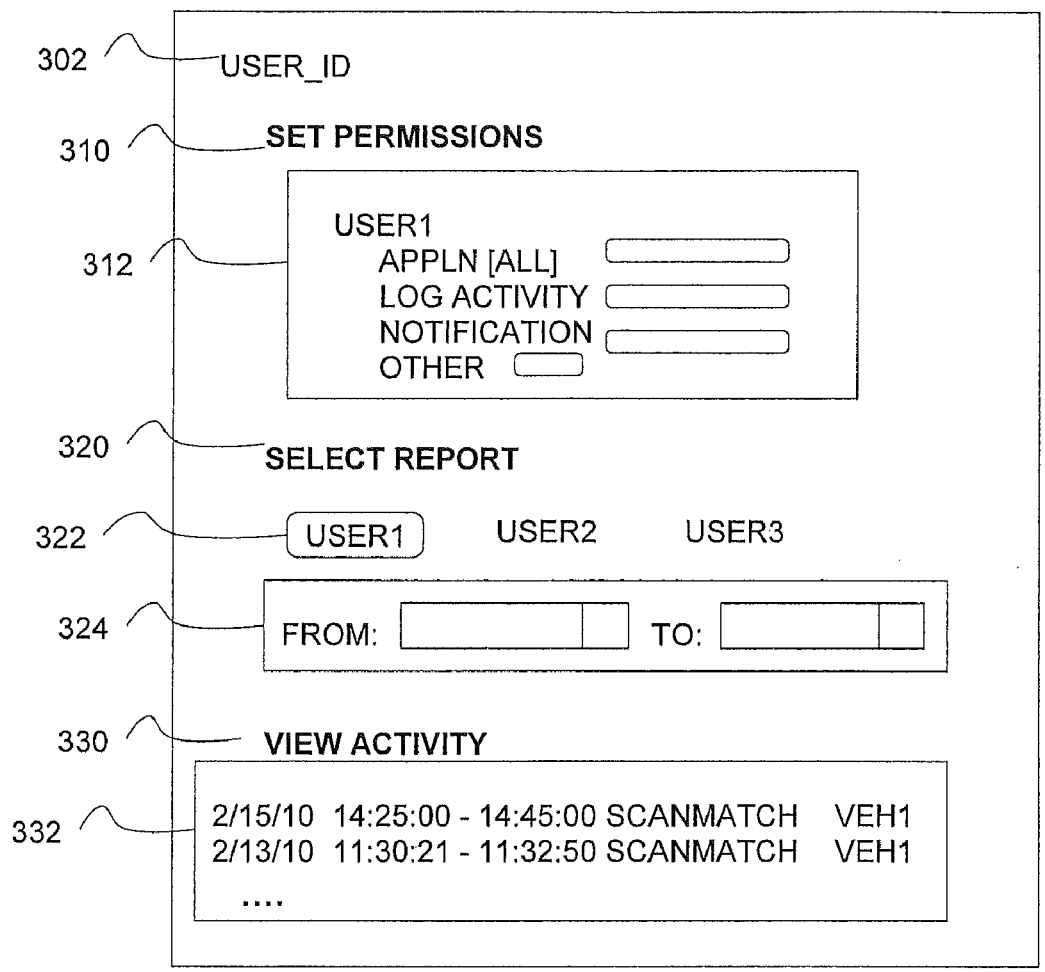
FIG. 3 illustrates a user interface screen implemented via the mobile device communications management services in an exemplary embodiment.

Turning now to FIG. 3, the user interface screen 300 will now be described in accordance with an exemplary embodiment. As indicated above, the user interface screen 300 includes options for an account holder or one with maximum permissions for an account, or other authorized entity (e.g., vehicle citation system 170) to configure various options for users within an account. The user interface screen 300 includes a user identification field (USER_ID) 302, which upon authentication of a user's credentials, this information is populated in the field 302. Also included in the user interface screen 300 are various options including SET PERMISSIONS 310, SELECT REPORT 320, and VIEW ACTIVITY 330.

The account holder or authorized entity may establish permissions for each user within the account via the SET PERMISSIONS option 310. Upon selection of this option 310, a window 312 is presented. As shown in FIG. 3 for illustrative purposes, only a single user (i.e., USER1) of the account is displayed. The permissions window 312 enables the account holder or authorized entity to establish various settings for the user. For example, an APPLN field in window 312 may be used to enter one or more applications 105 for which access is to be restricted upon determining the user (USER1) is operating a vehicle while attempting to use the mobile communications device 110. The account holder or authorized entity may select LOG ACTIVITY in the window 312, which causes the logic 115 to log any mobile communications device 110 activity that occurs while the user (USER1) is operating the vehicle 120. Additionally, a NOTIFICATION option in the window 312 may be selected, which causes the logic 115 to generate and transmit a notification to the account holder or authorized entity. The NOTIFICATION option may also include a field for entering an address to which the notification will be sent (not shown). These options may be selected alone or in combination (e.g., the logic 115 will log the activity, notify the account holder, and disable one or more applications 105 on the mobile communications device 110). Other options may be provided by the mobile device communications services as well. For example, using the option OTHER, an account holder or authorized entity may define conditions for which one or more of the aforementioned options in window 312 may be overridden. For example, suppose the logic 115 determines that the vehicle operator has accessed the voice application of the mobile communications device 110 and has entered an emergency telephone number, such as 911. The logic 115 may be configured via the OTHER option to indicate which conditions may be used in determining whether other configured options in window 312 will be overridden.

If the account holder or authorized entity has implemented the LOG ACTIVITY option for a user, any historical data captured may be presented by selecting the SELECT REPORT option 320. The account holder or authorized entity then selects a user 322, dates of interests via an option 324, and a log report is generated from the activities logged for the user and is presented via the user interface screen 300, as shown in a window 332. The account holder or authorized entity may review this information in order to assess the success or lack of success of the implemented options from window 312. Adjustments may be made to the options in window 312 accordingly. As shown in window 332, the date and time/duration reflects that a scan taken from the vehicle 120 matches a scan taken of the user of the mobile communications device 110 (SCANMATCH) with respect to a vehicle (VEH1).

The logic 115 may be configured to automatically log current or real-time activity, which may be accessed via the user interface screen 300 by selecting the VIEW ACTIVITY option 330. The logic 115 retrieves the data and presents it in the window 332, as described above.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for providing mobile device communications management, comprising:
   intercepting an input command received on a mobile communications device, the input command intercepted in response to detecting a presence of a fixed communications device that is embedded in a vehicle within range of the mobile communications device;
   acquiring biometric data from a user of the mobile communications device via an input component of the mobile communications device, the biometric data identifying the user;
   acquiring biometric data for an operator of the vehicle via a biometric scanner on a vehicle instrument of the vehicle;
   determining an activity status of the vehicle, the activity status indicating the vehicle is in operation by the operator when the biometric data of the operator is captured by the biometric scanner for a pre-defined sustained time period;

upon determining that the activity status reflects the vehicle is active, comparing the biometric data from the vehicle instrument with the biometric data for the user of the mobile communications device; and upon determining that the biometric data from the vehicle instrument matches the biometric data for the user of the mobile communications device, retrieving an account record associated with the user and implementing an action specified in the account record.

2. The method of claim 1, wherein the input command is an instruction to access an application, and the action implemented includes at least one of:

generating and transmitting a notification to an entity specified in the account record; and generating and transmitting a warning to the user.

3. The method of claim 1, wherein acquiring biometric data from the mobile communications device is by a fingerprint scanner communicatively coupled to the input component of the mobile communications device, and the biometric data is a fingerprint.

4. The method of claim 1, wherein vehicle instrument includes at least one of an operation handle and a steering wheel.

5. The method of claim 1, further comprising identifying a permissions value of the user of the mobile communications device, wherein determining the activity status is performed in response to identification of the user as one with less than maximum permission to operate the vehicle while using the mobile communications device.

6. The method of claim 5, wherein the permissions value is associated with the user via the account record, the user identified by one of a telephone number of the mobile communications device, a user identification stored for the account, and biometric data stored for the account that matches biometric data scanned via the input component.

7. The method of claim 6, further comprising:

generating the account record for each user in the account, and assigning at least one of a fixed communications device to the account and a vehicle to the account.

8. The method of claim 1, wherein the input command is an instruction to access an application, and the action implemented includes at least one of:

disabling a component of the mobile communications device that controls the application; and modifying operation of at least one vehicle operation components of the vehicle.

9. An apparatus for providing mobile device communications management, comprising:

a computer processor; and logic executing on the computer processor, the logic implementing a method, comprising:

intercepting an input command received on a mobile communications device, the input command intercepted in response to detecting a presence of a fixed communications device that is embedded in a vehicle within range of the mobile communications device;

acquiring biometric data from a user of the mobile communications device via an input component of the mobile communications device, the biometric data identifying the user;

acquiring biometric data for an operator of the vehicle via a biometric scanner on a vehicle instrument of the vehicle;

determining an activity status of the vehicle, the activity status indicating the vehicle is in operation by the operator when the biometric data of the operator is captured by the biometric scanner for a pre-defined sustained time period;

upon determining that the activity status reflects the vehicle is active, comparing the biometric data from the vehicle instrument with the biometric data for the user of the mobile communications device; and upon determining that the biometric data from the vehicle instrument matches the biometric data for the user of the mobile communications device, retrieving an account record associated with the user and implementing an action specified in the account record.

10. The apparatus of claim 9, wherein the input command is an instruction to access an application, and the action implemented includes at least one of:

generating and transmitting a notification to an entity specified in the account record; and generating and transmitting a warning to the user.

11. The apparatus of claim 9, wherein acquiring biometric data from the mobile communications device is by a fingerprint scanner communicatively coupled to the input component of the mobile communications device, and the biometric data is a fingerprint.

12. The apparatus of claim 9, wherein vehicle instrument includes at least one of an operation handle and a steering wheel.

13. The apparatus of claim 9, wherein the logic further implements:

identifying a permissions value of the user of the mobile communications device, wherein determining the activity status is performed in response to identification of the user as one with less than maximum permission to operate the vehicle while using the mobile communications device.

14. The apparatus of claim 13, wherein the permissions value is associated with the user via the account record, the user identified by one of a telephone number of the mobile communications device, a user identification stored for the account, and biometric data stored for the account that matches biometric data scanned via the input component.

15. The apparatus of claim 14, wherein the logic further implements:

generating the account record for each user in the account, and assigning at least one of a fixed communications device to the account and a vehicle to the account.

16. The apparatus of claim 9, wherein the input command is an instruction to access an application, and the action implemented includes at least one of:

disabling a component of the mobile communications device that controls the application; and modifying operation of at least one vehicle operation components of the vehicle.

17. A computer program product for providing mobile device communications management, the computer program product comprising a non-transitory storage medium encoded with machine-readable computer program code, which when executed by a computer, cause the computer to implement a method, the method comprising:

intercepting an input command received on a mobile communications device, the input command intercepted in response to detecting a presence of a fixed communications device that is embedded in a vehicle within range of the mobile communications device;

acquiring biometric data from a user of the mobile communications device via an input component of the mobile communications device, the biometric data identifying the user;

acquiring biometric data for an operator of the vehicle via a biometric scanner on a vehicle instrument of the vehicle;

determining an activity status of the vehicle, the activity status indicating the vehicle is in operation by the operator when the biometric data of the operator is captured by the biometric scanner for a pre-defined sustained time period;

upon determining that the activity status reflects the vehicle is active, comparing the biometric data from the vehicle instrument with the biometric data for the user of the mobile communications device; and upon determining that the biometric data from the vehicle instrument matches the biometric data for the user of the mobile communications device, retrieving an account record associated with the user and implementing an action specified in the account record.

18. The computer program product of claim 17, wherein the input command is an instruction to access an application, and the action implemented includes at least one of:

generating and transmitting a notification to an entity specified in the account record; and generating and transmitting a warning to the user.

19. The computer program product of claim 17, wherein acquiring biometric data from the mobile communications device is by a fingerprint scanner communicatively coupled to the input component of the mobile communications device, and the biometric data is a fingerprint.

20. The computer program product of claim 17, wherein vehicle instrument includes at least one of an operation handle and a steering wheel.

21. The computer program product of claim 17, wherein the program code further implements:

identifying a permissions value of the user of the mobile communications device, wherein determining the activity status is performed in response to identification of the user as one with less than maximum permission to operate the vehicle while using the mobile communications device.

22. The computer program product of claim 21, wherein the permissions value is associated with the user via the account record, the user identified by one of a telephone number of the mobile communications device, a user identification stored for the account, and biometric data stored for the account that matches biometric data scanned via the input component.

23. The computer program product of claim 22, wherein the program code further implements:

generating the account record for each user in the account, and assigning at least one of a fixed communications device to the account and a vehicle to the account.

24. The computer program product of claim 17, wherein the input command is an instruction to access an application, and the action implemented includes at least one of:

disabling a component of the mobile communications device that controls the application; and modifying operation of at least one vehicle operation components of the vehicle.

* * * * *